United States Patent [19]

Smidt, Jr. et al.

[11] 4,076,524
[45] Feb. 28, 1978

[54] REDUCTION IN SWELLING OF IRON CAUSED BY IRRADIATION

[75] Inventors: Fred A. Smidt, Jr., Springfield; James A. Sprague, Burke, both of Va.

[73] Assignee: The United States of America as represented by the Secretary of the Navy, Washington, D.C.

[21] Appl. No.: 416,139

[22] Filed: Nov. 15, 1973

[51] Int. Cl.$^2$ .............................................. C22C 38/12
[52] U.S. Cl. .............................. 75/123 J; 75/123 R; 75/123 D; 176/88
[58] Field of Search ................. 176/37, 88; 75/123 R, 75/123 D, 123 J

[56] References Cited

U.S. PATENT DOCUMENTS

| | | | |
|---|---|---|---|
| 2,209,248 | 7/1940 | Krause et al. | 75/123 D |
| 2,485,358 | 10/1949 | Case | 75/123 D |

OTHER PUBLICATIONS

Metals Abstracts, vol. 5, Oct. 1972, p. 1294; Abstract No. 16-0315.
Monsanto Chemical Co., Phosphorus–Iron Alloys Bulletin No. 2, 1940, pp. 6 & 7.
Transactions of ASM, vol. XLVI, 1954, pp. 277–281.

*Primary Examiner*—C. Lovell
*Attorney, Agent, or Firm*—R. S. Sciascia; Philip Schneider; Richard H. Shear

[57] ABSTRACT

Swelling of structural components of fast reactors is reduced by producing those components from an alloy consisting of iron and 0.3 at % V or P.

2 Claims, 3 Drawing Figures

REDUCTION IN SWELLING OF IRON CAUSED BY IRRADIATION

BACKGROUND OF THE INVENTION

Metals subjected to high neutron fluxes in high temperature environments, such as exists in fast breeder reactors and controlled thermonuclear reactors, undergo a phenomena known as swelling. Swelling produces volume expansion in components which has serious implications for the design of these components.

Energy costs increase due to swelling. A cost-benefit analysis conducted by P. R. Huebotter et al, USAEC Report ANL-7786, Argonne National Laboratory, 1971, indicated that having to accommodate only 5% swelling in breeder reactors over the period of 1970 to 2020 has a 1970 present worth of from $864 million to $5.6 billion relative to the case of 15% swelling. Hence, even small successes in the control of swelling yield enormous cost savings.

Consequently, many different techniques have been suggested to reduce swelling. Prevention of swelling was attempted by cold working of 316 stainless steel used in the Fast Flux Test Facility (FFTF). This has the disadvantage that cold work recovery occurs at temperatures near 0.6 of the absolute melting point of the material. Further, cold work may not be homogeneously distributed throughout the material, thus leaving certain areas where swelling may occur.

Another method attempted was the development of a fine dispersion of precipitates which acts as sinks for vacancies causing swelling. This principle has been demonstrated by a nickel-base alloy developed by the British. It is, however, subject to over-aging of the precipitate at elevated temperatures and instability of the precipitate in high neutron fluxes.

Mechanical solutions have been attempted as well. These involve the use of articulated, flexible or undercut ducts, replaceable structural components, etc. Attempts have also been made to reduce neutron energy by introducing core moderators. Neither has been highly successful.

SUMMARY

According to the novel aspects of the invention, swelling is reduced by forming the structural components of the reactor from iron to which 0.3 at % V or P has been added. By so doing, vacancies that would agglomerate to form a void are trapped by the vanadium or phosphorous solute atom, thus preventing the formation of such voids in the ferritic metal. By suppressing the formation of the voids, swelling is reduced and prevented.

It is therefore an object of the invention to provide a novel method for the prevention of swelling in structural components of fast reactors.

A second object of the invention is to provide a means by which voids are suppressed.

Another object of the invention is to provide an alloying element having an attraction for vacancies to reduce the supersaturation of vacancies free to enter into void formation.

Other objects, advantages and novel features of the invention will become apparent from the following detailed description of the invention when considered in conjunction with the accompanying drawings wherein:

DETAILED DESCRIPTION

In accordance with the present invention swelling of structural components in fast reactors is prevented by forming said components from a ferritic metal or Fe to which 0.3 at % V or P has been added. Swelling is produced as a consequence of the coalescence of vacancies, created by displacement of atoms in the solid, into voids or holes in the solid. One of the major factors influencing void nucleation is the supersaturation of vacancies existing in the metal during irradiation. The present invention prevents swelling by introducing an alloying element, V or P, into the metal which has an attraction for vacancies and thus prevents the vacancies from coalescing into void. Supersaturation of vacancies in the material is reduced which results in the reduction or total elimination of swelling.

Figure 1:
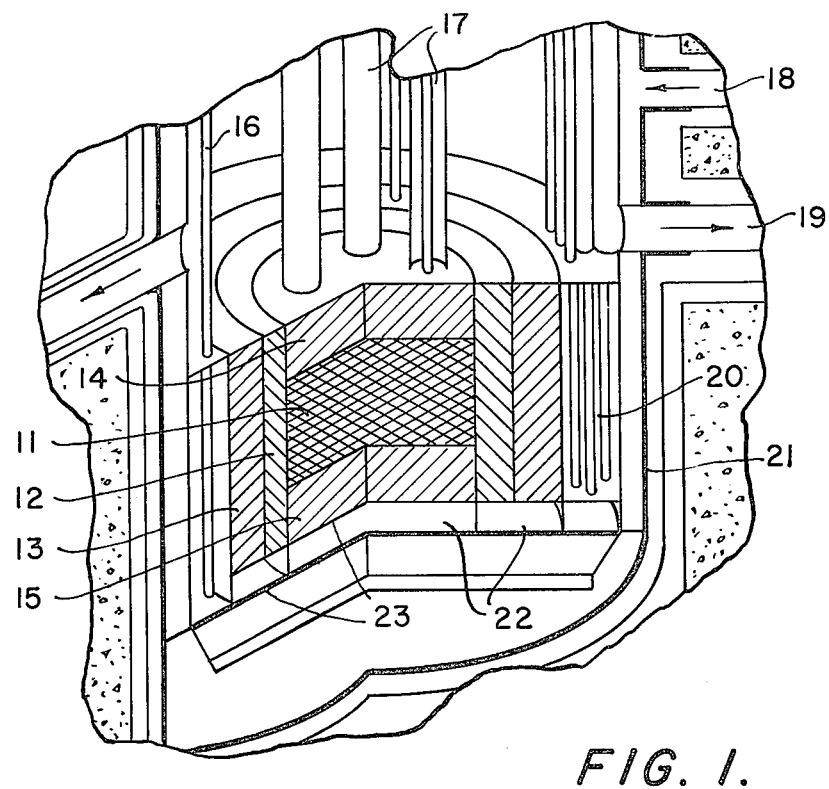
FIG. 1 illustrates a cross-section of a typical liquid-metal cooled fast breeder reactor (LMFBR)

The alloy consisting of Fe plus 0.3 at % V or P is used to produce structural components within a fast reactor. Conventional melt processes may be used to produce the alloy, i.e., open hearth. FIG. 1 shows a typical LMFBR core and its surrounding components. Ferrous alloys have service temperatures up to 930° to 1100° F. The temperature in the core may be as high as 1400° F. When temperatures of about 1400° F are used, the alloy should not be used to produce core components 11. The alloy could be used to produce components surrounding the core. A list of some of the components as illustrated in FIG. 1 follows:

Radial Blanket: 12
Thermal Shield: 13
Upper Axial Blanket: 14
Lower Axial Blanket: 15
Fuel Removal Tube: 16
Control and Instrument Guide Tubes: 17
Coolant Inlet: 18
Coolant Outlet: 19
Grid Plate: 23

Production of these components using the alloy of the invention would result in a reactor free from swelling in those components.

Figure 2:
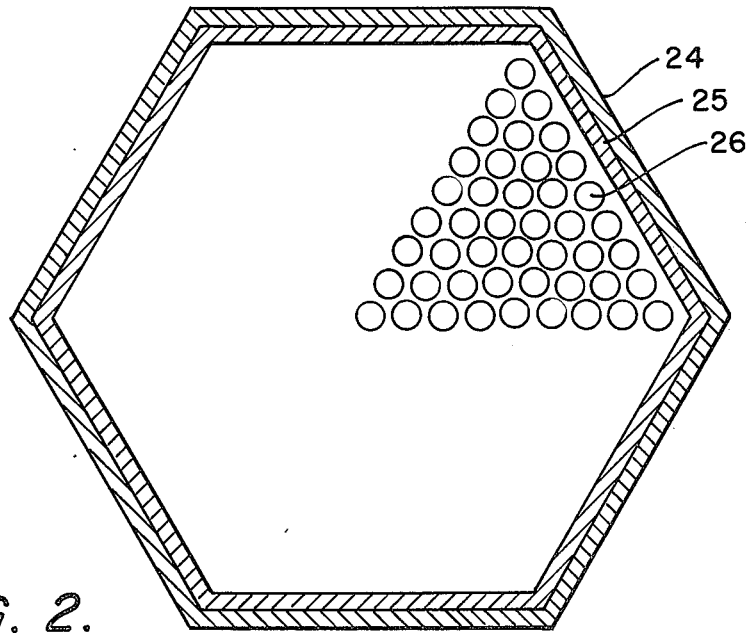
FIG. 2 illustrates a cross-section of a typical LMFBR fuel assembly.

FIG. 2 illustrates a cross-section of a typical LMFBR fuel assembly. Spacer pad 24 is shown surrounding wrapper tube 25. The assembly holds fuel elements 26 comprising a solid fuel wrapped in cladding. The cladding could be produced from the alloy of the invention, however, temperature limitations might limit its effectiveness. The wrapper tube and spacer pad could be produced from the alloy of the invention.

Figure 3:
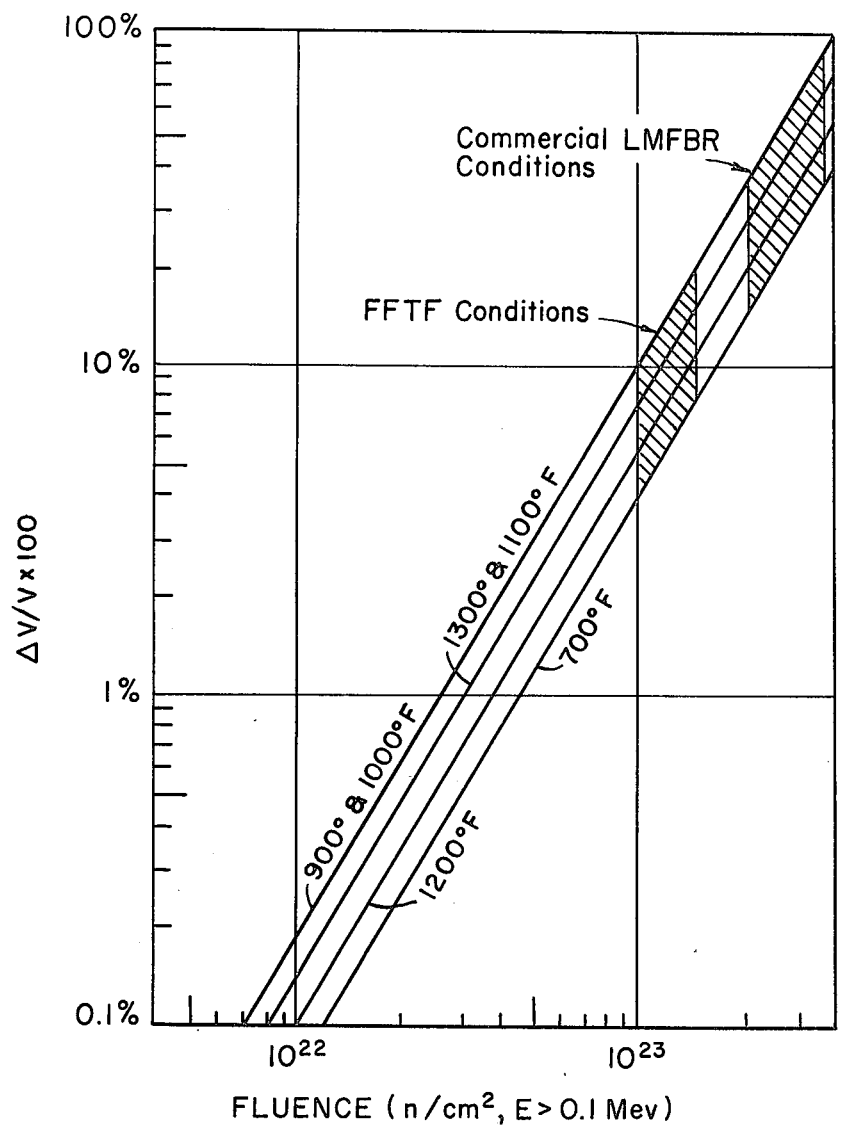
FIG. 3 is a graph illustrating the predicted swelling of 304 and 316 stainless steels as a function of fluence and temperature.

FIG. 3 is a graph of the change in volume $\Delta V/V$ of stainless steel components when subjected to high fluences at high temperature. It can be seen that swelling occurs at fluences below $10^{22}$ n/cm$^2$ and enormous swelling occurs at FFTF and LMFBR conditions.

A series of iron alloys were prepared to study the influences of oversize substitutional, atoms such as V or P. The alloys, which included 0.3 at — % Cr, V, Ni, P were prepared from a high purity Battelle zone refined iron. Vendors analysis showed the major impurities to be 5 ppm Cu, 5 ppm P, 3 ppm C, 5 ppm S, 10 ppm Si, 15 ppm Al, <1 ppm N, 26 ppm O, 20 ppm Ni and 5 ppm Cr. The alloys and a control sample of iron were cast in high purity alumina crucibles in a vacuum induction furnace, and a portion of the case was rolled to a 0.002 inch strip to use for microscopy specimens. This strip was then treated in a stream of $H_2$ at 745° C for 95 hours, quick cooled and baked in a vacuum for 4 hours at 145° C to remove hydrogen.

The specimens were then irradiated at fluences of $4.9 \times 10^{20}$ n/cm$^2$, E > 0.1 MeV, 280° C and $8.5 \times 10^{21}$ n/cm$^2$ E > 0.1 MeV, 525° C. At $4.9 \times 10^{20}$ n/cm$^2$ voids were not found in the alloys of Fe — 0.3 at % V and Fe — 0.3 at % P. At $8.5 \times 10^{21}$ n/cm$^2$ Fe — 0.3 at % V showed no voids while small voids were detected in the phosphorous alloy.

Heavy ion experiments were performed as well. The Fe — 0.3 at % V alloy was subjected to a fluence capable of producing 32 displacements per atom (dpa). Since $7.4 \times 10^{21}$ n/cm$^2$ produced 5.5 dpa, 32 dpa required a fluence of $(32/5.5) \times 7.4 \times 10^{21}$ or $4.37 \times 10^{22}$ n/cm$^2$ was required. No voids were detected when the alloy was irradiated at temperatures between 450° C to 700° C.

By forming nuclear reactor components from iron to which oversize solute atoms have been added, swelling is found to be reduced as discussed above.

Obviously, many modifications and variations of the present invention are possible in light of the above teachings. It is therefore to be understood that within the scope of the appended claims the invention may be practiced otherwise than as specifically described. What is claimed and desired to be secured by Letters Patent of the United States is:

1. Ferrous nuclear reactor core components having substantial resistance to swelling caused by neutron irradiation consisting essentially of 99.7 at % of iron and 0.3 at % of a solute atom selected from the group consisting of vanadium and phosphorus.

2. A method for reducing swelling in metallic components of nuclear reactors which comprises fabricating said components with an alloy consisting essentially of 99.7 at % iron and of 0.3 at % a solute atom selected from the group consisting of vanadium and phosphorus.

* * * * *